Patented May 16, 1933

1,909,692

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF NEW VAT DYESTUFFS OF THE ANTHRAQUINONE SERIES

No Drawing. Application filed September 27, 1928, Serial No. 308,876, and in Germany October 17, 1927.

In our co-pending application Ser. No. 267,478 filed April 4, 1928, a process for the production of new vat dyestuffs giving chiefly grey to black dyeings on cotton is described which consists in condensing polynuclear aromatic compounds containing a keto group such as ms-benzdianthrones, ms-naphthodianthrones, allo - ms - naphthodianthrones, ms-anthradianthrones, dibenzanthrones, isodibenzanthrones, anthraquinones, benzanthrones, anthanthrones, dibenzpyrenquinone, anthraquinoneacridones, indigo, thioindigo and the like containing at least one negative substituent, such as halogen or a nitro group and the like, or pyranthrones containing several such negative substituents, with a nitrogenous dibenzanthrone which expression comprises dibenzanthrone, isodibenzanthrone or the derivatives thereof containing at least one nitrogen atom with a reactive hydrogen atom attached thereto. The said vat dyestuffs probably correspond to the general formula:

wherein R stands for a dibenzanthrone radicle, R' stands for a polynuclear aromatic radicle containing a keto group, as aforementioned, which may be substituted, for example, by further radicles of the type:

and X stands for hydrogen or a simple alkyl radicle.

We have now found that new and extremely fast vat dyestuffs which chiefly also give grey to black dyeings on cotton in a single operation, are obtained by treating the products produced according to the said application Ser. No. 267,478 with alkaline or acid condensing agents, such as caustic potash, alcoholic potash, aluminium chlorid and the like, in the presence, if desired, of solvents or diluents, such as trichlorbenzene, aniline and the like. The condensation is carried out at between 150° and 300° C. The new products are distinguished by an excellent affinity for the fibre and are probably formed from the initial material by the elimination of hydrogen atoms and the formation of one or more carbazol rings and accordingly correspond to the general formula:

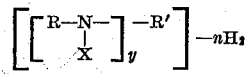

wherein R stands for a dibenzanthrone radicle, R' stands for a polynuclear aromatic radicle containing a keto group, which may be substituted, for example, by further radicles of the type

and X stands for hydrogen or a simple alkyl radicle $y$ being the number of dibenzanthronylamino radicles attached to R' and $n$ being a number between 1 and $3y$. Generally speaking they give violet solutions in concentrated sulfuric acid, and their vat solutions are also, for the most part, violet or violet-blue. In order to purify the dyestuff its paste may be treated with hypochlorite, or the dried dyestuff may be boiled with an organic solvent of high boiling point such as nitrobenzene and the like in order to extract admixtures.

The following examples will further illustrate the nature of the said invention which however is not limited thereto. The parts are by weight.

Example 1

10 parts of the reaction product obtainable by condensation of mono-amino-dibenzanthrone and beta-chloranthraquinone are introduced slowly, while stirring, into 100 parts of fused caustic potash at from 245° to 250° centigrade, the stirring being continued until the formation of the dyestuff is complete, a condition which can be recognized from the fact that the vat of a sample of the reaction product is of a violet color. After cooling, the product is taken up with hot water, and the precipitation of the dyestuff is completed by introducing a current of air into the mixture, the product being then filtered by suction while hot. The dyestuff, which is obtained in the form of a black paste, dissolves to a violent solution in concentrated sulfuric acid, and gives very fast grey to black dyeings on cotton from the violet vat. In order to purify the dyestuff, the paste may be treated with hypochlorite, or the dried dyestuff, a black powder, is extracted by boiling with nitrobenzene or other suitable organic solvent of high boiling point.

*Example 2*

25 parts of the dyestuff prepared from monoaminodibenzanthrone and 1-chloranthraquinone are stirred at 120° centigrade into a melt of from 150 to 180 parts of caustic potash and 130 to 140 parts of ethyl alcohol. The temperature is then raised to from 175° to 180° centigrade and stirring is continued until the formation of dyestuff ceases to increase. The mixture is then cooled, and it is treated in the manner specified in Example 1. The dyestuff,

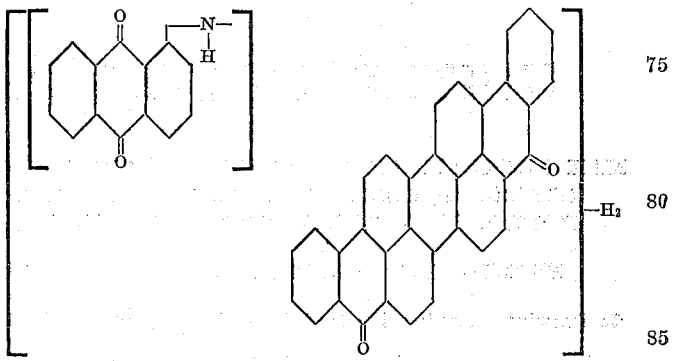

which is obtained in the form of a black paste, gives very fast black dyeings on cotton from a violet vat. It dissolves to a violet solution in concentrated sulfuric acid, and it can be purified in the manner described in Example 1.

*Example 3*

50 parts of the condensation product obtainable by condensation of 6-chlorbenzanthrone and monoaminodibenzanthrone (prepared according to U. S. Patent No. 796,393) are fused, at from 250° to 260° centigrade with 400 parts of caustic potash until the formation of the dyestuff is completed. After cooling, the melt is taken up with hot water and is treated as in Example 1. The dyestuff,

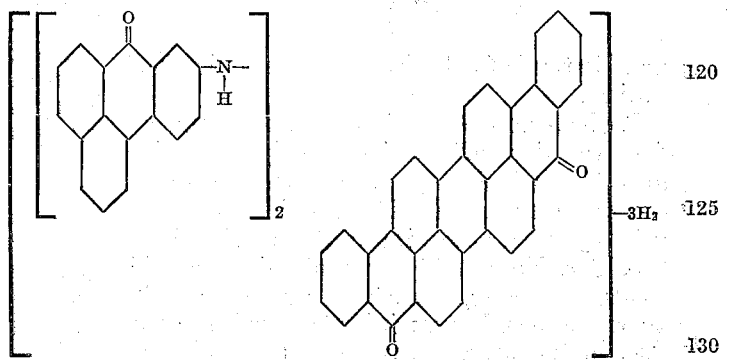

of which an excellent yield is obtained in the form of a black paste, gives black dyeings on the vegetable fibre from a blue violet vat. It dissolves to a violet solution in concentrated sulfuric acid, and can be purified with hypochlorite, or by extraction with a boiling solution of caustic alkali, or with organic solvents of high boiling point.

If the 6-chlorbenzanthrone be replaced, for the condensation with aminodibenzanthrone, by other halogenbenzanthrones, such as 8-chlorbenzanthrone, the condensation products from the potash melt furnish dyestuffs of very similar properties to the one described above.

*Example 4*

A mixture of 100 parts of the condensation product from 8-chlorbenzanthrone and aminodibenzanthrone, prepared according to the process described in the specification Ser. No. 267,478, and 100 parts of anhydrous aluminium chloride, is heated at from 220° to 230° centigrade in the oil bath until the formation of the dyestuff is completed. When cold, the reaction mixture is decomposed with water and dilute hydrochloric acid, and the resulting dyestuff probably corresponding to the formula:

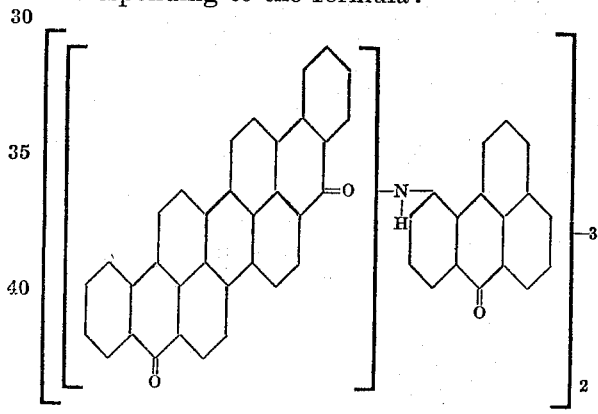

is filtered by suction. It gives greenish grey to olive black dyeings according to the quantity of the dyestuff employed, on cotton from a blue vat. It dissolves to a brown violet solution in concentrated sulfuric acid.

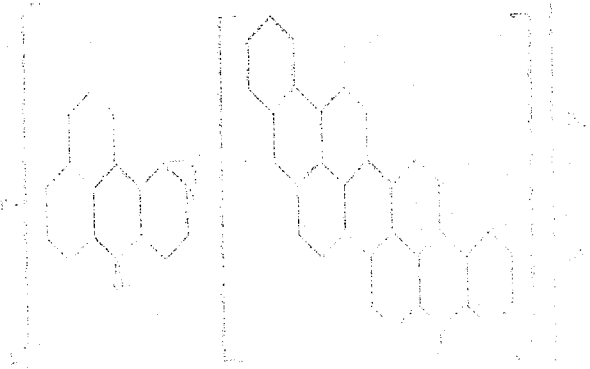

What we claim is:—

1. Vat dyestuffs giving grey to black dyeings on cotton from blue-violet to violet vats, and violet solutions in concentrated sulfuric acid, the said dyestuffs probably corresponding to the general formula:

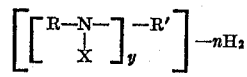

wherein R stands for a dibenzanthrone radicle, R' stands for a polynuclear aromatic radicle containing a keto group and X stands for hydrogen or a simple alkyl radicle $y$ being the number of dibenzanthronylamino radicles attached to R' and $n$ being a whole number between 1 and $3y$.

2. Vat dyestuffs giving grey to black dyeings on cotton from blue-violet to violet vats and violet solutions in concentrated sulfuric acid, the said dyestuffs probably corresponding to the general formula:

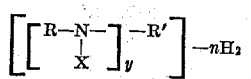

wherein R stands for a dibenzanthrone radicle, R' stands for an anthraquinonyl radicle and X stands for hydrogen or a simple alkyl radicle $y$ being the number of dibenzanthronylamino radicles attached to R' and $n$ being a whole number between 1 and $y$.

3. A process for the production of new vat dyestuffs giving grey to black dyeings on cotton in a single dyeing operation, which comprises treating the condensation products of the general formula:

wherein R stands for a dibenzanthrone radicle, R' stands for a polynuclear aromatic radicle containing a keto group which may be substituted by further radicles of the type

and X stands for hydrogen or a simple alkyl radicle, with a condensing agent.

4. A process for the production of new vat dyestuffs giving grey to black dyeings on cotton in a single dyeing operation, which comprises treating the condensation products of the general formula:

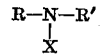

wherein R stands for a dibenzanthrone radicle, R' stands for a polynuclear aromatic radicle containing a keto group which may be substituted by further radicles of the type

and X stands for hydrogen or a simple alkyl radicle, with an alkaline condensing agent.

5. A process for the production of new vat dyestuffs giving grey to black dyeings on cotton in a single dyeing operation, which comprises treating the condensation products of the general formula:

$$R-N(X)-R'$$

wherein R stands for a dibenzanthrone radicle, R' stands for a polynuclear aromatic radicle containing a keto group which may be substituted by further radicles of the type $$R-N(X)-,$$

and X stands for hydrogen or a simple alkyl radicle, with a caustic alkali.

6. A process for the production of new vat dyestuffs giving grey to black dyeings on cotton in a single dyeing operation which comprises treating the condensation products of the general formula:

$$R-N(X)-R'$$

wherein R stands for a dibenzanthrone radicle, R' stands for a polynuclear aromatic radicle containing a keto group which may be substituted by further radicles of the type $$R-N(X)-,$$

and X stands for hydrogen or a simple alkyl radicle, with an alcoholic caustic alkali.

7. A process for the production of new vat dyestuffs giving grey to black dyeings on cotton in a single dyeing operation, which comprises treating the condensation products of the formula:

$$R-N(X)-R'$$

wherein R stands for a dibenzanthrone radicle, R' for an anthraquinonyl radicle and X for hydrogen or a simple alkyl radicle, with a condensing agent.

In testimony whereof we have hereunto set our hands.

MAX ALBERT KUNZ.
KARL KOEBERLE.